UNITED STATES PATENT OFFICE.

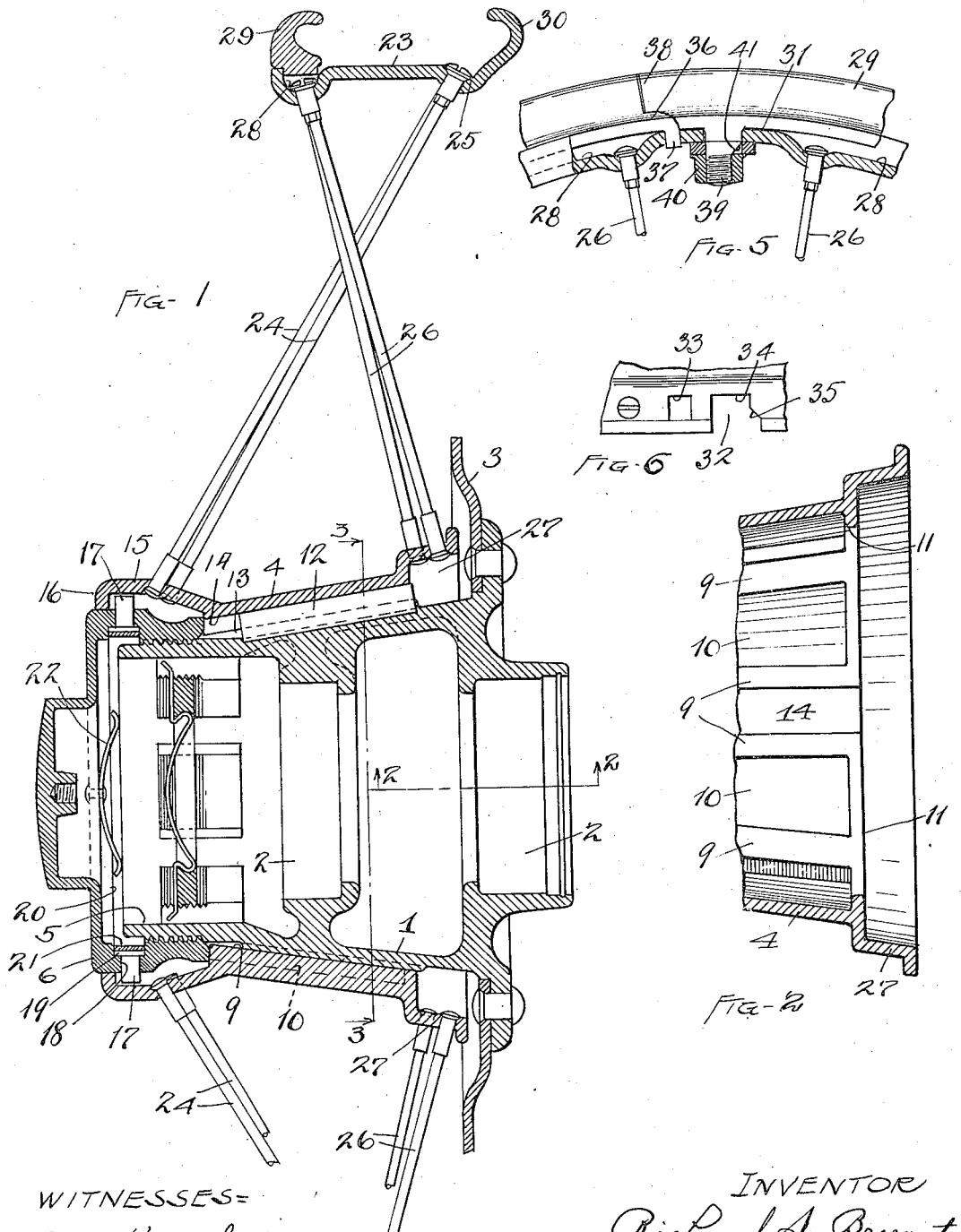

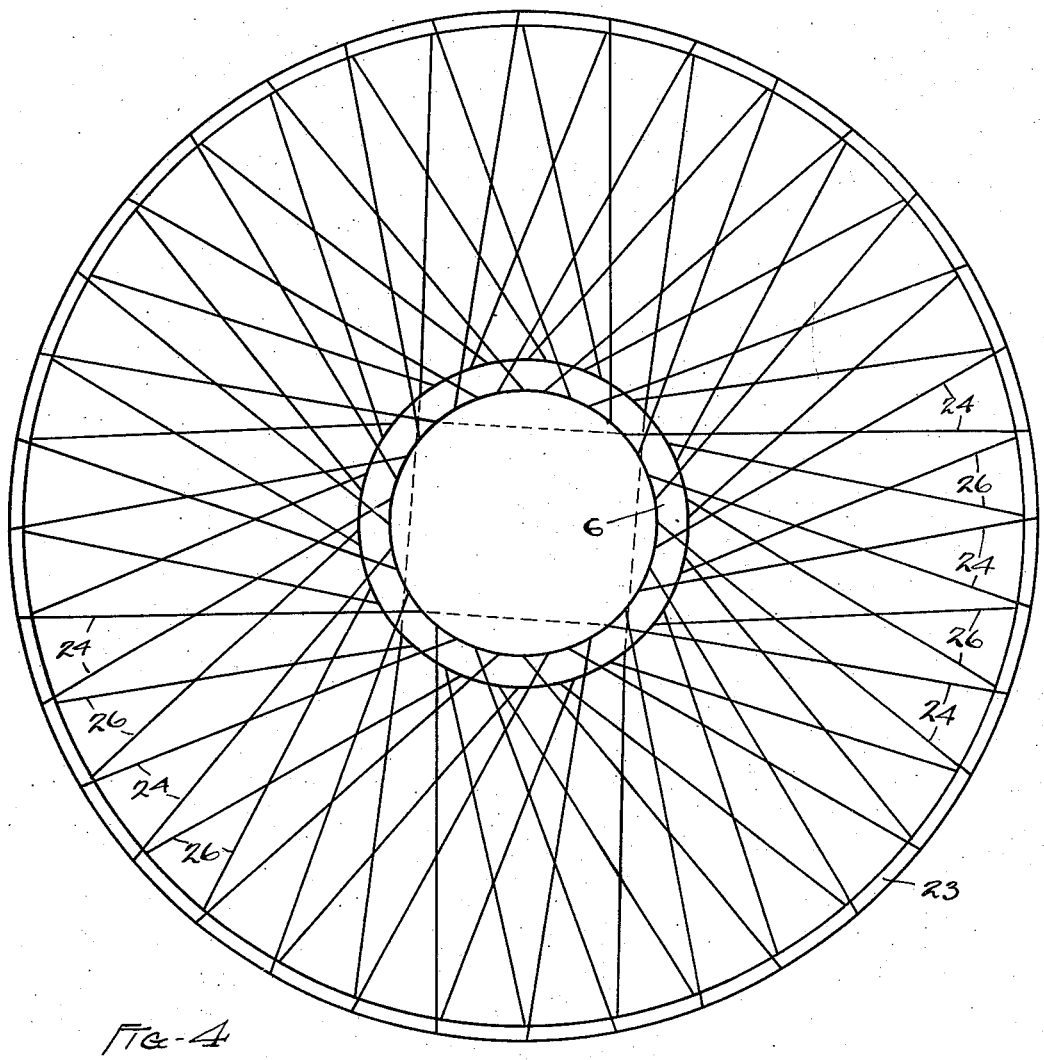
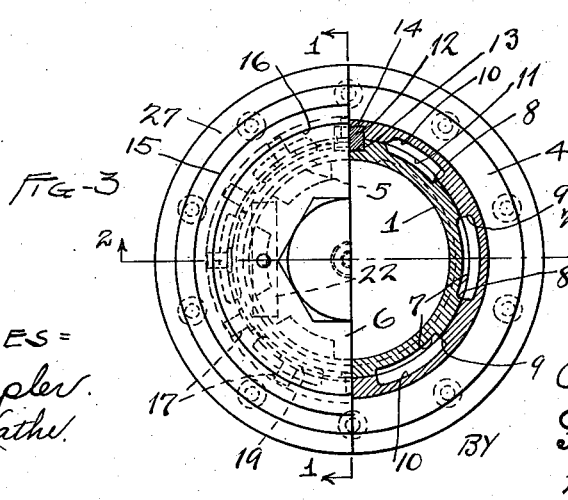

RICHARD S. BRYANT, OF CLEVELAND, OHIO, ASSIGNOR TO THE STANDARD WELDING COMPANY, OF CLEVELAND, OHIO, A CORPORATION OF OHIO.

VEHICLE-WHEEL.

1,179,399.      Specification of Letters Patent.     Patented Apr. 18, 1916.

Application filed December 15, 1913. Serial No. 806,709.

*To all whom it may concern:*

Be it known that I, RICHARD S. BRYANT, a citizen of the United States, and a resident of Cleveland, county of Cuyahoga, and State of Ohio, have invented a new and useful Improvement in Vehicle-Wheels, of which the following is a specification, the principle of the invention being herein explained and the best mode in which I have contemplated applying that principle, so as to distinguish it from other inventions.

The present improved vehicle wheel is of the wire spoke type of construction and embodies, in addition to a special arrangement or "lacing" of the spokes, an improved construction of detachable or demountable hub, whereby the outer portion of the latter, which carries the spokes, and thereby the rim, may be readily removed from the inner or permanent hub member.

The particular features constituting the invention, then, will be hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings: Figure 1 is a central vertical section of a vehicle wheel embodying the present improvements; Fig. 2 is a sectional view of a portion of the outer hub member, the plane of the section being indicated by the line 2—2, Fig. 1; Fig. 3 is a partial front elevation and partial transverse vertical section of the complete hub, the plane of the section being indicated by the line 3—3, Fig. 1; Fig. 4 is an elevational view, more or less diagrammatic in character, of the outer hub member, the rim, and the wire spokes which connect the same to such hub member; and Figs. 5 and 6 show details of the rim construction.

Referring first to the construction of the hub, as shown in Figs. 1, 2 and 3, it should be observed that it is a rear hub that is specifically shown in such figures, and particularly in Fig. 1, the inner hub member 1, which is in the form of a general tapering sleeve, being designed to be rotatably mounted on the end of the tubular supporting axle (not shown), within which lies the live axle (likewise not shown), such live axle being non-rotatably connected with said inner hub member, as will be readily understood. Ball bearings, furthermore, will be interposed between inwardly directed races 2 on said hub member and the tubular supporting axle. Where the hub is mounted on a front axle, a solid spindle will take the place of the tubular supporting axle, and the means provided for clutching or non-rotatably securing said inner hub member to the live axle will be omitted. Where the hub is designed for use on the rear axle, the inner member will ordinarily be provided with a brake drum, the flanged portion 3 only of such drum appearing in Fig. 1. The difference just referred to as existing between a hub designed for the rear axle and one for the front axle lie wholly in the inner or permanent hub member, it being intended that the outer hub member 4, and for that matter the rest of the wheel structure, should be the same for both front and rear wheels so as to render the latter interchangeable. As stated, the inner hub member 1 is of general tapered form, but its terminal portion 5 is substantially cylindrical, being externally threaded to receive an internally threaded cap or nut 6, which closes the end of said inner hub member and also serves to secure the outer hub member firmly thereon, as will be presently described. The other tapering or beveled surface of said inner hub member is cut away in places to form a series of longitudinally extending recesses 7 with similarly extending lands 8 therebetween, as best shown in Fig. 3. The main portion of the outer or removable hub member 4 has its inner surface tapered to conform with the tapered surface of the inner hub member and is correspondingly recessed so as to have longitudinally extending lands 9 complementary with those of said inner hub member. The recesses 10, in the case of such outer hub member, do not extend entirely through, so that the lands just referred to are connected by an encircling rib 11, as it were, such rib being shown best in Fig. 2.

Mounted in a longitudinally extending land of one of the hub members, preferably in a land 8 of the inner hub member as shown, is a key 12 which rises above such land, said key being permanently secured by welding or otherwise, in a slot 13 formed in the land. A complementary land in the outer hub member is then grooved to form a way 14 adapted to engage such key, this groove extending entirely through the land, as shown in Fig. 2. In assembling the wheel, accordingly, the outer hub member, being placed on the inner hub member, is rotated until this way 14 is brought into alinement with the key 12, whereupon said outer hub member may be forced back until all the complementary lands on the two members are in close fitting contact. The encircling rib 11 at the inner ends of the lands on the outer hub member facilitate the proper location of the outer hub member on the inner hub member by preventing the former from being forced back until the key is alined with the way. The outer end portion 15 of this removable hub member is flared, as best shown in Fig. 1, so as to surround the threaded portion of the cap 6 which closes the end of the inner hub member and serves to prevent longitudinal displacement of the outer hub member thereon by pressing against the outer ends of the lands 9 on the latter. This cap is furthermore desirably rotatably secured to said outer hub member, so that, when it is unscrewed from the inner hub member, it will draw the outer hub member longitudinally off from said inner hub member. To this end the extreme outer edge of the removable hub member is slightly recurved to form a shoulder 16, with which engage a series of short pins 17 that project through suitable apertures 18 in the cap, such pins being provided with heads 19 adapted to seat in a groove 20 formed on the inside of such cap. A transversely split annular spring 21 serves to hold these pins in place by pressing outwardly against their heads, as will be readily understood.

It should be explained that so far as the aforesaid pins 17 exemplify separate antifriction means for rotatably securing the cap or nut 6 to the outer or removable hub member, such means are broadly claimed in my co-pending application filed September 19, 1913, Serial No. 790,786, wherein such pins, as well as other equivalent elements for accomplishing the same result, are shown and described. There is, of course, no contact, frictional or otherwise, between the cap 6 and any stationary part, such as might tend to unscrew the same, and the danger of such cap coming loose is practically negligible. However, as a precautionary measure, I prefer to attach a double spring clip 22 to the inner face of the cap at one side of the same so that the ends of said clip are adapted to resiliently engage the front end of the inner or permanent hub member, as shown in Figs. 1 and 3. Such spring, thus pressing against the inner hub member, will overcome any tendency which may be present for the cap to jar loose.

The rim 23, which I preferably employ in conjunction with my demountable hub, is of the "quick detachable" type; that is, the outermost of the two tire-securing flanges is in the form of a transversely split ring so as to be readily detachable in order to place a tire on said rim or remove one therefrom, the rim being specially designed to utilize the same groove in which the heads of the spokes are seated, to also seat such detachable flange, as will presently be described.

The wire spokes, which are used to connect the rim and the outer hub member, are arranged in two series, the spokes 24 of one series being connected at their inner ends to the flaring end portion of the outer hub member, and at their outer ends to the inner edge of the rim, the latter being formed with an encircling groove 25 arranged to receive the heads of the spokes, as shown in Fig. 1. The spokes 26 of the other series have their inner ends attached near the inner edge of the removable hub member, the latter being formed with a radially offset portion 27 for this purpose, while the outer ends of said second series of spokes are attached near the front edge of the rim, which is formed with a second encircling groove 28 for this purpose. This last named groove, however, is of deeper cross-section than the one at the inner edge of the rim, so as to be adapted to receive the base of the detachable tire-retaining flange 29, as previously indicated. The inner tire-retaining flange 30 is preferably formed integral with the rim.

In order to receive the heads of the corresponding series of wire spokes, the groove 28, instead of being formed with a flat bottom as heretofore, where designed to receive only the tire-retaining flange, is made with a rounded bottom, so that a space is left below the flat, i. e., cylindrical, inner face of the ring to accommodate the heads of the spokes. At the point in the periphery of the rim, however, where it is desired to provide means for locking to said rim the ends of the split ring, the portion 31 of the bottom of said groove lying between two adjacent spoke ends is raised to present a flat bearing surface, as shown in Fig. 5, against which surface the under faces of such ends of the ring are adapted to contact. This raised, flattened portion of the groove bottom is then provided with a lateral notch 32 of the shape clearly shown in Fig. 6, and with a rectangular recess or aperture 33 on one side of such notch. The notch comprises a rectangular seating portion 34, with a flaring or beveled end wall 35 extending outwardly therefrom on the side of the notch farthest removed from the aperture 33.

The one end of the split ring is formed with a projection 36 terminating in a downwardly turned lug 37 of the lateral, form clearly appearing in Fig. 5, and of a cross-sectional form adapted to fit the rectangular aperture 33 in the bottom of the groove. The other end of the ring terminates in a projection 38 of a form complementary to that presented by the projection 36 just described, such second end being, in effect, undercut so as to overlap the projection on the first end, as clearly illustrated in said Fig. 5. This second end is furthermore provided with a downwardly turned lug 39, either integral therewith or rigidly attached thereto and having a cross-sectional form adapted to fit the inner rectangular portion of the notch when the end is in proper place. This lug has its outer end threaded to receive a nut 40 and it also includes an intermediate portion with a beveled face 41 adapted to engage the end wall of the notch.

The foregoing described device for securing the ends of the detachable side flange or split ring to the tire supporting rim, it should be explained, forms the subject matter of a separate patent heretofore issued to the applicant herein, viz., No. 1,160,254, dated November 16, 1915, no claim being made in the present case to this particular detail of construction.

From the foregoing description it will be seen that the lug on such second end of the split ring may be easily forced laterally in place by engagement of its outer portion with the bevel 35 in the end wall of the notch itself; while, upon pressing downwardly, having regard to the axis of the wheel, the intermediate beveled face 41 on the lug itself assists in forcing the lug into its final locking position, drawing up or pulling on the ring, incidentally to doing so, until such second end of the ring engages the first end as shown in Fig. 5.

The principle upon which the spokes of the respective series 24 and 26 are arranged, remains to be explained. Each such series is made up of a number of pairs of substantially parallel spokes disposed in oppositely extending but complementary relation on opposite sides of the hub. This is indicated in Fig. 4 by the dotted lines connecting the inner ends of two such pairs of spokes in each of the two series of the latter. By reason of the foregoing construction it will be seen that vertical strains or stresses are at all times taken up by at least four spokes directly in line with the direction of such strain or stress. At the same time the crossing of the series braces the rim against lateral strains while still leaving an unusual road clearance, the spokes for some distance within the rim approaching each other so as to occupy less transverse space than does the rim itself. The advantage of this construction in passing through ruts or mire will be readily appreciated.

The various features, above described as characterizing my improved wheel, coöperate to produce an extremely sturdy construction embodying all the advantages of the present quick-detachable wheel, and yet being but little if any heavier than the so-called "demountable" rim wheel in which the tire-supporting rim is bodily removable from the felly. In other words, the outer hub member of the present wheel, with the tire-supporting rim having a detachable flange, may be handled and carried with no more inconvenience than an ordinary demountable rim. The specific locking means provided for securing the demountable hub member on the permanent hub member, are not only simple but easy to manufacture and entirely positive and sure in operation.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A wheel for vehicles and the like, comprising a permanent hub-member of general tapered form; longitudinally extending lands on the tapered portion of said member; a removable hub-member supporting the wheel structure, proper, and having longitudinally extending lands complementary to those on said permanent hub-member; and means adapted non-rotatably to secure said two hub-members together with the lands on the one in register with those on the other.

2. A wheel for vehicles and the like, comprising a permanent hub-member of general tapered form; longitudinally extending lands on the tapered portion of said member; a removable hub-member supporting the wheel structure, proper, and having longitudinally extending lands complementary to those on said permanent hub-member; a similarly extending key on a land of one of said members, the complementary land on the other member being formed with a way adapted to engage said key and thereby non-rotatably secure said members together; with the lands on the one in register with those on the other; and an encircling rib at the inner end of the hub-member formed with such way, said rib being continuous save opposite said way, whereby said removable member is prevented from being mounted on said permanent member except with said key in alinement with such way.

3. A wheel for vehicles and the like, comprising an inner hub member; an outer hub member longitudinally movable on said inner member into non-rotative engagement therewith, said outer member supporting the wheel structure, proper; a nut adapted to be threaded on said inner member and to press against said outer member; and a series of pins projecting radially from said nut into engagement with said outer member, thereby rotatably securing the former to the latter.

4. A wheel for vehicles and the like, comprising an inner hub member; an outer hub member longitudinally movable on said inner member into non-rotative engagement therewith, said outer member supporting the wheel structure, proper; a nut adapted to be threaded on said inner member and to press against said outer member, said nut being formed with an internal groove; a series of headed pins seated in such groove and projecting radially from said nut into engagement with said outer member, thereby rotatively securing the former to the latter; and a spring adapted to retain said pins in place.

Signed by me, this 12 day of Dec., 1913.

RICHARD S. BRYANT.

Attested by—
M. H. WILLIAMS,
R. C. COOLEY.